C. G. OBERLEY & R. GRIGNON.
FRICTION CLUTCH.
APPLICATION FILED AUG. 23, 1912.
1,055,787.
Patented Mar. 11, 1913.
2 SHEETS—SHEET 1.
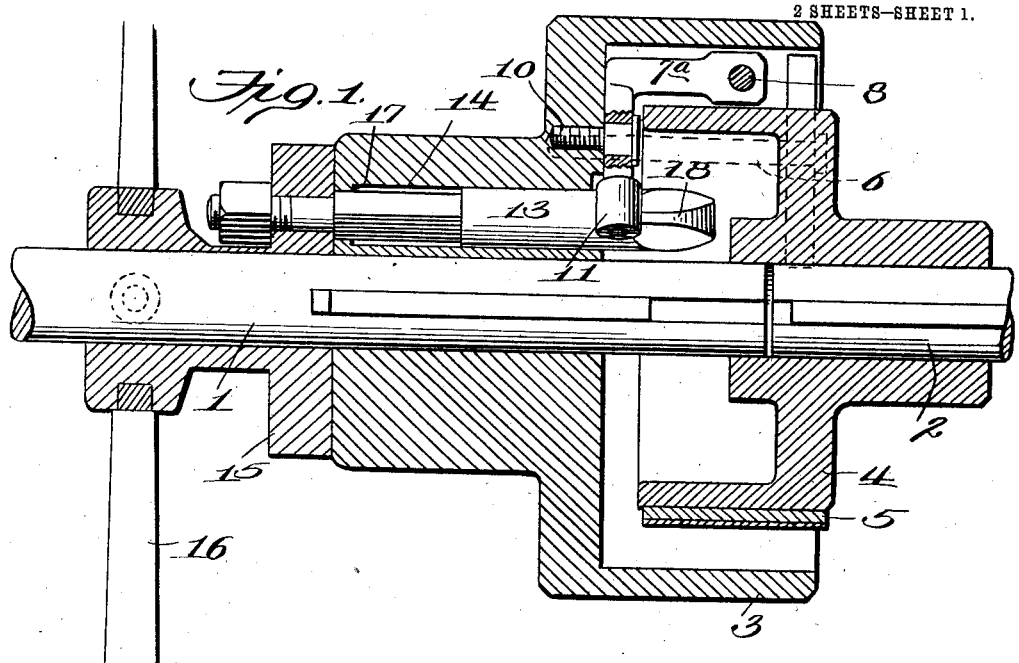
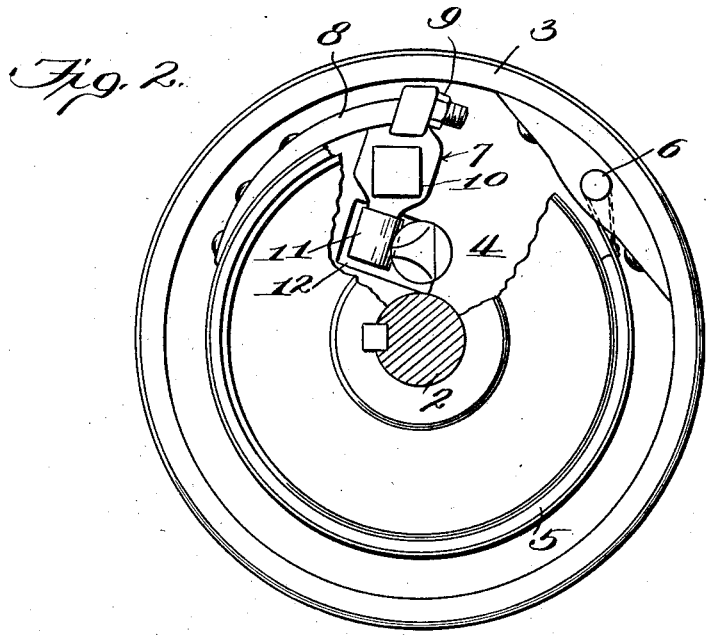
Witnesses:
Inventors
Charles G. Oberley
Robert Grignon
by
Atty C. G. OBERLEY & R. GRIGNON.
FRICTION CLUTCH.
APPLICATION FILED AUG. 23, 1912.
1,055,787.
Patented Mar. 11, 1913.
2 SHEETS—SHEET 2.
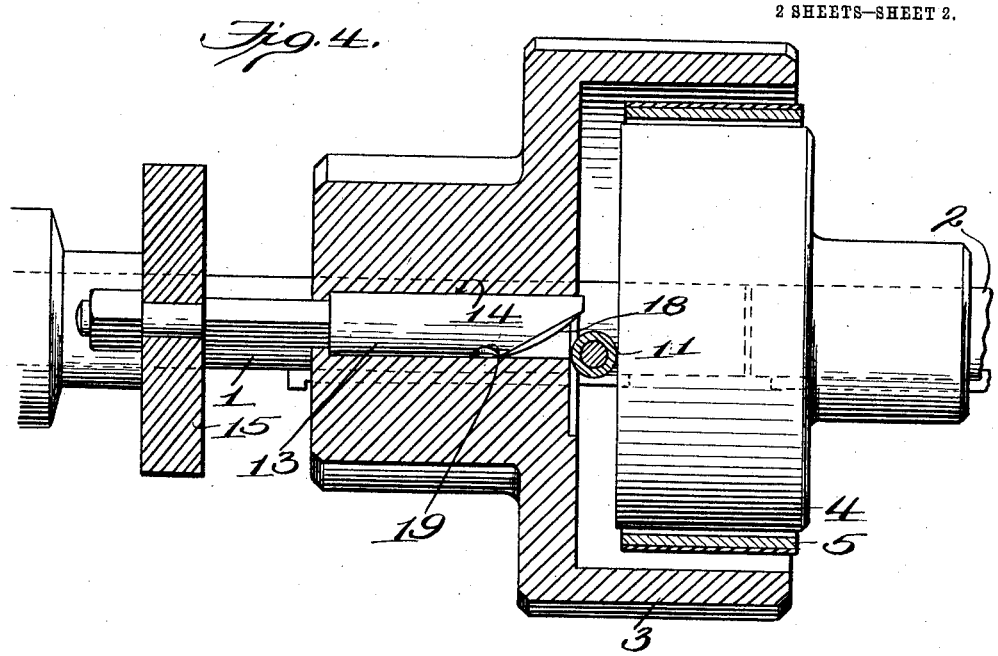
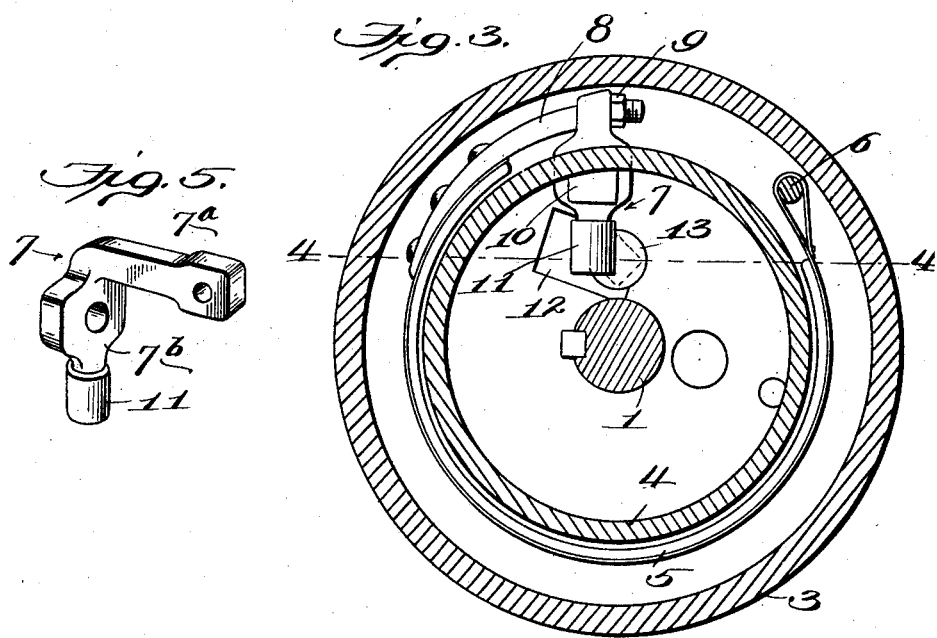

UNITED STATES PATENT OFFICE.

CHARLES G. OBERLEY, OF ST. CLOUD, AND ROBERT GRIGNON, OF SARTELL, MINNESOTA.

FRICTION-CLUTCH.

1,055,787.  Specification of Letters Patent.  Patented Mar. 11, 1913.

Application filed August 23, 1912. Serial No. 716,772.

*To all whom it may concern:*

Be it known that we, CHARLES G. OBERLEY and ROBERT GRIGNON, citizens of the United States, residing at St. Cloud and Sartell, respectively, in the county of Stearns and State of Minnesota, have invented new and useful Improvements in Friction-Clutches, of which the following is a specification.

This invention relates to improvements in friction clutches of that type wherein two companion concentric drum-like parts and an intermediate clutch band are employed, the function of the clutch band being to connect the companion parts whereby one is driven from the other or to disconnect the companion parts whereby the driving part runs free.

The principal object of the invention is to provide a construction of the general type stated wherein the adjustment may be made in an easy and facile manner and wherein the parts are organized with simplicity, compactness, and strength.

An embodiment of the invention is illustrated in the accompanying drawings, in which:—

Figure 1 is a vertical central sectional view with the companion driving and driven parts in connected relation; Fig. 2 is a view in end elevation, partly broken away to show the internal organization and with the parts in connected relation; Fig. 3 is a cross-sectional view showing the companion parts in disconnected relation; Fig. 4 is a longitudinal sectional view on the line 4—4 of Fig. 5; and Fig. 5 is a detail perspective view of a lever element which is connected to an end of the clutch band and forms a part of the means for tightening or loosening said band.

Similar characters of reference designate corresponding parts throughout the several views.

In the example disclosed, power is to be transferred from one shaft to another, the two shafts being shown at 1 and 2 and in alining relation. The companion drum-like parts above referred to are shown at 3 and 4, the part 3 being keyed or otherwise fast on the shaft 1 and inclosing the part 4 which is fast on the shaft 2. The clutch band is shown at 5 and surrounds the part 4, being adapted to be tightened thereon and when tightened to connect the parts 3 and 4 so that one will be driven by the other. The ends of the band 5 are secured to the part 3, one end being fixed as by a pin 6 and the other end being movably secured, for this purpose, being joined to a lever 7. The lever 7 includes an arm $7^a$ which projects over the drum 4 and which terminates in an eye to receive the end of the strap 8, by means of which the band 5 is connected to said lever. A nut 9 is threaded upon the end of the strap 8 to make secure the connection thereof with the arm $7^a$. The lever 7 includes, also, a vertical arm $7^b$ which lies against the flat vertical wall of the drum 3 and is pivoted to said wall, as by a bolt or pin 10. The arm $7^b$ works between the flat vertical wall of the drum 3 and the adjacent end of the drum 4 and at its inner end carries a roller 11 to accommodate which the flat wall of the drum 3 is recessed as at 12. When the lever 7 is moved in a direction to cause the movable end of the band 5 to approach the fixed end thereof, said band is tightened upon the drum 4. To effect such a movement of the lever 11 an axially slidable pin 13 may conveniently be employed. In the example disclosed, the pin 13 is parallel to the shaft 1 and is movable axially through an opening 14 in the hub of the drum 4, the opening 14 terminating at one end of the recess 12. The pin 13 may be carried by a slidable part, for example, a collar 15 which is slidable on the shaft 1 and is operated by a lever 16. The opening 14 may be shouldered at its outer end as at 17 and beyond the shoulder it may be of square outline. In this case the inner portion of the pin 13 will be enlarged so as to abut the shoulder 17 as a stop when the pin is moved outwardly, and the outer portion of the pin may be squared to conform to the outline of the squared portion of the opening 15 and thereby to prevent the pin from having any turning movement which, in the construction shown, might interfere with its efficient action.

The pin 13 at its inner end has a cam face 18 for engagement with the roller 11 and inwardly of the face 18 a transverse groove 19 in which the roller 11 is held by the tension of the band 5 when the latter is tight upon the drum part 4.

Assuming that the band 5 is loose upon the part 3 and that the driving element is running free, as shown in Fig. 3, when it is desired to connect the parts 3 and 4 so that one will be driven by the other, the collar 15 and therewith the pin 13 is moved inwardly. Ultimately, the cam face 15 of said pin engages the roller 11 and rocks the lever 7 as shown in Fig. 2, so that the movable end of the band 5 approaches the fixed end of said band and the latter is thereby clamped tightly upon the part 4, thus putting the parts 3 and 4 in connected relation and providing for the rotation of the one with the other. This relation is maintained by the engagement of the roller 11 in the groove 19. While this engagement is sufficiently strong to prevent an accidental outward movement of the pin 13, it does not interfere with an intentional outward movement thereof, as when the parts 3 and 4 are to be disconnected. When the pin 13 is withdrawn and the lever 7 is released, the band 5 will become loose on the part 3, and the driving part will be permitted to run free.

It will be observed that the connection between the band 5 and the lever 7 is located centrally between the sides of the parts 4. This location of said connection not only provides for centralizing the tension on the band, but it also enables the band to be reversed upon the part 4, in case it is necessary or desirable to reverse the direction of the pull on said band. For this latter purpose the part 3 has in its flat side wall, approximately ninety degrees distant from the pin 13 and the lever 7 when located as shown and at the opposite side of the pin 6, openings 20 and 21. The opening 20 is provided to receive the bolt or pin 10 which forms the pivot of the lever 7 and the opening 21, which is located inwardly of the opening 20 and is exactly similar to the opening 14 above described, is provided to receive the pin 13. When it is desired to reverse the direction of pull on the band 5, the band is first disconnected from the lever 7 and from the pin 6, and is disposed on the part 4 so as to extend in an opposite direction from the pin 6, but with the same face upon the band $x$, after which it is again connected to said pin. Thereupon, the location of the lever 7 and pin 13 is changed in the manner indicated, i. e., by engaging the bolt or pin 10 in the opening 20 and the pin 13 in the opening 21, after which the band is again connected to the lever 7 in the manner shown.

While the invention has been disclosed in connection with the transmission of power from one shaft to an alining shaft or to two alining shafts, one of which will run constantly, it is to be understood that the invention is not limited to this application and that it may be used for the transmission of power to or between gear elements other than shafts.

Having fully described our invention, we claim:

1. In a friction clutch, two companion concentric parts adapted to be connected to rotate together or to be disconnected whereby one part may run free of the other, a clutch band surrounding the inner part and having one end fixed to the outer part, the outer part having a flat end wall a lever which is pivoted to said flat wall and is arranged between said wall and the adjacent end of the inner part, the other end of the band being connected to said lever, and a pin slidable through said flat wall and having a cam face for engagement with the lever to rock the latter and thereby tighten the band upon the inner part.

2. In a friction clutch, two companion concentric parts adapted to be connected to rotate together or to be disconnected whereby one part may run free of the other, a clutch band surrounding the inner part and having one end fixed to the outer part, the outer part having a flat end wall a lever which is pivoted to said flat wall and is arranged between said flat wall and the adjacent end of the inner part, the lever having an arm which overhangs the inner part and to which the other end of the band is connected, and a pin slidable through said flat wall and having a cam face for engagement with the lever to rock the latter and thereby tighten the band upon the inner part.

3. In a friction clutch, two companion concentric parts adapted to be connected to rotate together or to be disconnected whereby one part may run free of the other, a clutch band surrounding the inner part and having one end fixed to the outer part, the outer part having a flat end wall a lever which is pivoted to said flat wall and is arranged between said flat wall and the adjacent end of the inner part, the other end of the band being connected to said lever, and a pin slidable through said flat wall and having a cam face for engagement with the lever to rock the latter and thereby tighten the band upon the inner part, the pin also having a transverse groove located inwardly of said cam face and in which the lever engages under the tension of the band when the latter is tight upon the inner part.

4. In a friction clutch, two companion concentric parts adapted to be connected to rotate together or to be disconnected whereby one part may run free of the other, a clutch band surrounding the inner part and having one end fixed to the outer part, the outer part having a flat end wall a lever which is pivoted to said flat wall and is arranged between said flat wall and the adjacent end of the inner part, the other end of the band being connected to said lever, the said flat wall having an opening therethrough which is shouldered and has a portion thereof of square outline and a pin slidable through said opening and having a square portion which works in the square portion of said opening, the pin also having a cam face for engagement with the lever to rock the latter and thereby tighten the band upon the inner part.

In testimony whereof we have hereunto set our hands in presence of two subscribing witnesses.

CHARLES G. OBERLEY.
ROBERT GRIGNON.

Witnesses:
R. B. BLOWER,
W. A. SMITH.

Copies of this patent may be obtained for five cents each, by addressing the "Commissioner of Patents, Washington, D. C."